(12) United States Patent
Nyce

(10) Patent No.: US 9,389,061 B2
(45) Date of Patent: Jul. 12, 2016

(54) POSITION SENSOR WITH IMPROVED SIGNAL TO NOISE RATIO

(71) Applicant: David Scott Nyce, Apex, NC (US)

(72) Inventor: David Scott Nyce, Apex, NC (US)

(*) Notice: Subject to any disclaimer, the term of this patent is extended or adjusted under 35 U.S.C. 154(b) by 408 days.

(21) Appl. No.: 13/834,665

(22) Filed: Mar. 15, 2013

(65) Prior Publication Data

US 2014/0266162 A1 Sep. 18, 2014

(51) Int. Cl.
G01B 7/30 (2006.01)
G01B 7/14 (2006.01)
G01R 33/02 (2006.01)
G01B 7/00 (2006.01)

(52) U.S. Cl.
CPC . *G01B 7/14* (2013.01); *G01B 7/003* (2013.01)

(58) Field of Classification Search
CPC ............ G01B 7/14; G01B 7/30; G01B 7/003; G01B 17/00; G01R 33/02; G01N 33/28; G01N 22/00; G01D 5/485
USPC ....................... 324/207.13, 207.24, 244.1, 96; 385/12–15; 343/884
See application file for complete search history.

(56) References Cited

U.S. PATENT DOCUMENTS

| | | | | |
|---|---|---|---|---|
| 3,579,204 A * | 5/1971 | Lincoln | ........................ | 365/184 |
| 3,898,555 A * | 8/1975 | Tellerman | ................ | 324/207.13 |
| 5,043,685 A * | 8/1991 | Nyce | ........................ | G06F 3/043 |
| | | | | 310/26 |
| 5,050,135 A * | 9/1991 | Pai et al. | ........................ | 367/127 |
| 5,070,485 A * | 12/1991 | Nyce | ...................... | G01D 5/485 |
| | | | | 324/207.13 |
| 5,206,586 A * | 4/1993 | Yauch | ...................... | G01D 5/485 |
| | | | | 324/207.13 |
| 5,296,586 A * | 3/1994 | Burch et al. | .................. | 528/274 |
| 5,367,255 A * | 11/1994 | Nyce | ...................... | G01B 7/003 |
| | | | | 324/207.12 |
| 5,483,149 A * | 1/1996 | Barrett | ........................ | 323/300 |
| 5,717,330 A * | 2/1998 | Moreau | .................. | G01D 5/485 |
| | | | | 324/207.13 |
| 5,736,855 A * | 4/1998 | Smith | .................... | G01B 17/00 |
| | | | | 324/207.13 |
| 5,886,518 A * | 3/1999 | Kuroda et al. | ........... | 324/207.13 |
| 6,222,714 B1 * | 4/2001 | Hoffman | ................ | H02H 3/006 |
| | | | | 361/62 |
| 6,417,701 B1 * | 7/2002 | Bolda | ..................... | H03K 5/088 |
| | | | | 327/333 |
| 6,490,379 B2 * | 12/2002 | Boudreau | .......... | G02B 6/12004 |
| | | | | 385/14 |
| 6,583,615 B1 * | 6/2003 | Kathol | ................... | G01D 5/485 |
| | | | | 324/207.12 |
| 7,239,129 B2 * | 7/2007 | Steinich | ................. | G01D 5/485 |
| | | | | 324/207.13 |
| 7,619,405 B2 * | 11/2009 | Steinich | ................. | G01D 5/485 |
| | | | | 324/207.13 |
| 2004/0207390 A1 * | 10/2004 | Sprecher | .................. | 324/207.13 |
| 2005/0001607 A1 * | 1/2005 | Berland | ............ | G01R 31/3277 |
| | | | | 324/67 |
| 2005/0046513 A1 * | 3/2005 | Raphalovitz et al. | ........ | 333/148 |
| 2005/0114053 A1 * | 5/2005 | Southward | ............. | G01B 7/023 |
| | | | | 702/66 |
| 2005/0237680 A1 * | 10/2005 | Egner | ...................... | H02H 3/33 |
| | | | | 361/42 |
| 2008/0116861 A1 * | 5/2008 | Kernahan | ............. | H03H 11/265 |
| | | | | 323/267 |
| 2009/0027824 A1 * | 1/2009 | Allen et al. | .................... | 361/170 |
| 2009/0146645 A1 * | 6/2009 | Steinich et al. | .......... | 324/207.13 |
| 2013/0003712 A1 * | 1/2013 | Kunc et al. | .................... | 370/345 |
| 2014/0132246 A1 * | 5/2014 | Schwind | ................ | G01R 25/00 |
| | | | | 324/76.82 |

* cited by examiner

Primary Examiner — Jermele M Hollington
Assistant Examiner — Lamarr Brown

(57) ABSTRACT

A magnetostrictive position sensor achieves an improved signal to noise ratio by implementing several electronic control features, including: enclosing a waveguide within an approximately tubular return conductor, adjusting the energy of an interrogation pulse and then clamping the waveguide, tracking the peak voltage of a sensed signal, cutting off the signal of a pickup during the time period outside of a signal time frame, adjusting the pass band of a filter based on an interrogation rate and waveguide length, zeroing and scaling a signal without digitizing the signal, and avoiding noise from an interrogation voltage generator.

18 Claims, 9 Drawing Sheets

POSITION SENSOR WITH IMPROVED SIGNAL TO NOISE RATIO

BACKGROUND OF THE INVENTION

1. Field of the Invention

The present invention relates to position sensors that utilize a magnetostrictive waveguide to implement a linear, curved, or rotary measurement path, while measuring the position of a permanent magnet target, called the position magnet. Multiple position measurements, or measuring the position over a time period, may also be used to provide a measurement of acceleration. The higher signal to noise (S/N) ratio of an improved sensor enables it to achieve a higher performance level, which may include reducing the level of error, reducing the power requirement, optimizing magnetic field strengths, or other parameters. The sensor improvements include a shielded waveguide, waveguide clamp, voltage selector, switched voltage increasing circuit, signal clamp, voltage adjusting circuit, adjustable switched capacitor filter, and a signal path that does not run through a microcontroller.

2. Description of the Prior Art

Magnetostrictive position sensors are well known in the Prior Art. Such Prior Art sensors are often designed for measuring linear position, but some curved and rotary versions have also been available on the market. In a magnetostrictive position sensor, a pulse of current (called the interrogation pulse) is applied to a waveguide (i.e. it is interrogated). The amount of current is usually in the range of 0.5 to 5.0 amperes, and the pulse duration is usually in the range of 0.5 to 5.0 microseconds. The pulse is repeated upon command or at a fixed or variable rate. When at a fixed rate, the amount of time between pulses is usually in the range of 0.1 microseconds to 0.1 seconds. A position magnet is located somewhere along the length of the waveguide, at a position that is to be measured. Upon application of the interrogation pulse, the waveguide becomes magnetized due to the current flow in the waveguide. Vector summing of the waveguide magnetic field with the field of the position magnet results in the application of a torsional force to the waveguide at the location of the position magnet. A torsional strain wave is formed, which travels along the length of the waveguide at a speed of approximately 3,000 meters per second. A pickup device for detecting the strain wave is mounted near one end of the waveguide, usually near the electronic circuitry needed to operate the sensor. When the interrogation pulse is applied, a timer is started. When the strain wave is detected by the pickup, the timer is stopped. The elapsed time measured by the timer is proportional to the distance between the position magnet and the pickup. So, the location of the position magnet can be determined with respect to the pickup. It is common practice in such a position sensor to connect a copper wire to one end of the waveguide and position the copper wire in parallel with the waveguide to provide a return path for the interrogation current. The copper wire is called the return wire or return conductor. It is also common practice to enclose both the waveguide and return wire within an outer metal tube. In this configuration, the current pulse is conducted through the waveguide, and back through the return wire, completing the circuit. But since the interrogation pulse can have an amplitude of several amperes and is applied to a long ferromagnetic material (the waveguide), electromagnetic interference (EMI) can be formed.

It is desirable to obtain a high signal to noise ratio in the measurement transducer as well as in the signal processing electronics. There are several prior art methods for increasing the signal level, as well as for reducing the noise level.

The signal level can be increased by increasing the current of the interrogation pulse, but excessive current in the interrogation pulse causes an increase in the power requirement of the position sensor. The signal level can also be increased by adding more turns to a pickup coil, but using very fine wire becomes a manufacturing difficulty, and using a pickup of a much larger physical size results in a signal pulse that is not as sharp, and therefore increases noise. Signal level can also be increased by using a waveguide material having higher permeability, but this sacrifices other desired qualities of the waveguide material, such as maintaining a uniform speed of the strain wave over a wide temperature range.

To maintain a high signal to noise ratio, it is important to keep a signal at a proper level for reliable detection. In the linear position sensor of U.S. Pat. No. 5,640,109, a method is taught for electronically adjusting the amplitude of the signal. Accordingly, the circuitry includes an adjustable first threshold value, a stored second threshold value, and a magnitude comparator that is used to adjust the second stored threshold value depending on whether or not the amplitude of the signal exceeds the first threshold value.

BRIEF SUMMARY OF THE INVENTION

The present invention teaches an improvement to Prior Art magnetostrictive position sensors by increasing the ratio of the signal level to the noise level, and maintaining this higher S/N ratio throughout the several stages of signal handling as are beneficial to producing a desired output signal. The amplitude of the signal is increased, as well as the level of noise being reduced.

The return conductor surrounds the waveguide, such as with a tubular-shaped return conductor. The return conductor is also connected to a shielding voltage, such as ground. This prevents EMI from being emitted from the waveguide.

The greater signal level is first obtained from the waveguide and position magnet without increasing the energy delivered to the waveguide, by abruptly grounding out the waveguide drive circuit at a time following the waveguide interrogation pulse. This allows the use of a higher pulse current to be applied for a shorter amount of time, while retaining or reducing the average current (reducing power requirement) and increasing the signal pulse amplitude. The signal pulse amplitude is increased due to the greater interrogation pulse current. Due to the increased signal level, a position magnet may have less strength or be used at a greater distance from the waveguide, if desired. The energy of the shorter interrogation pulse width is utilized more effectively, providing the effect of a longer interrogation pulse width, by clamping the input current side of the waveguide after the falling edge of the interrogation pulse. The waveguide clamp is a switching circuit that connects across the two ends of the waveguide circuit, essentially shorting out the waveguide for a time after the shortened interrogation pulse. The energy that was stored in the waveguide inductance during the shortened interrogation pulse then continues to energize the waveguide to extend the effective pulse width of the interrogation pulse. Keeping the waveguide clamped during the periods in between interrogations also eliminates the receiving of EMI because both ends of the waveguide are essentially grounded. The greater of two voltages, a power supply voltage and a generated voltage, is selected to develop an interrogation voltage across a capacitance for the purpose of producing the interrogation pulse.

The high signal level from the pickup is preserved while keeping the noise level low by cutting off the signal of the pickup (signal clamp) during time periods the pickup signal is not being utilized, and by applying only the amount of gain needed to bring the signal peak to a desired amount. Further, the S/N ratio is maintained at a high level by zeroing and scaling the analog signal while avoiding analog to digital and digital to analog conversions. Additionally, noise in the analog circuitry is avoided by turning off a voltage generator for the waveguide pulse circuit, during an amount of time that depends on the waveguide length.

BRIEF DESCRIPTION OF THE SEVERAL VIEWS OF THE DRAWINGS

For further understanding of the nature and objects of the present invention, reference is made to the following figures in which like parts are given like reference numerals and wherein.

DETAILED DESCRIPTION OF THE INVENTION

The invention comprises several parts that may be implemented together to increase the signal to noise ratio (S/N) of a position sensor. These several parts include a shielded waveguide, waveguide clamp, voltage selector, switched voltage increasing circuit, signal clamp, voltage adjusting circuit, adjustable switched capacitor filter, and a signal path running outside of a microcontroller, in which a microcontroller controls adjustments of zero and span. Each part of the invention individually provides some benefit, but they work more beneficially together to provide the greatest increase in S/N ratio.

Figure 1:
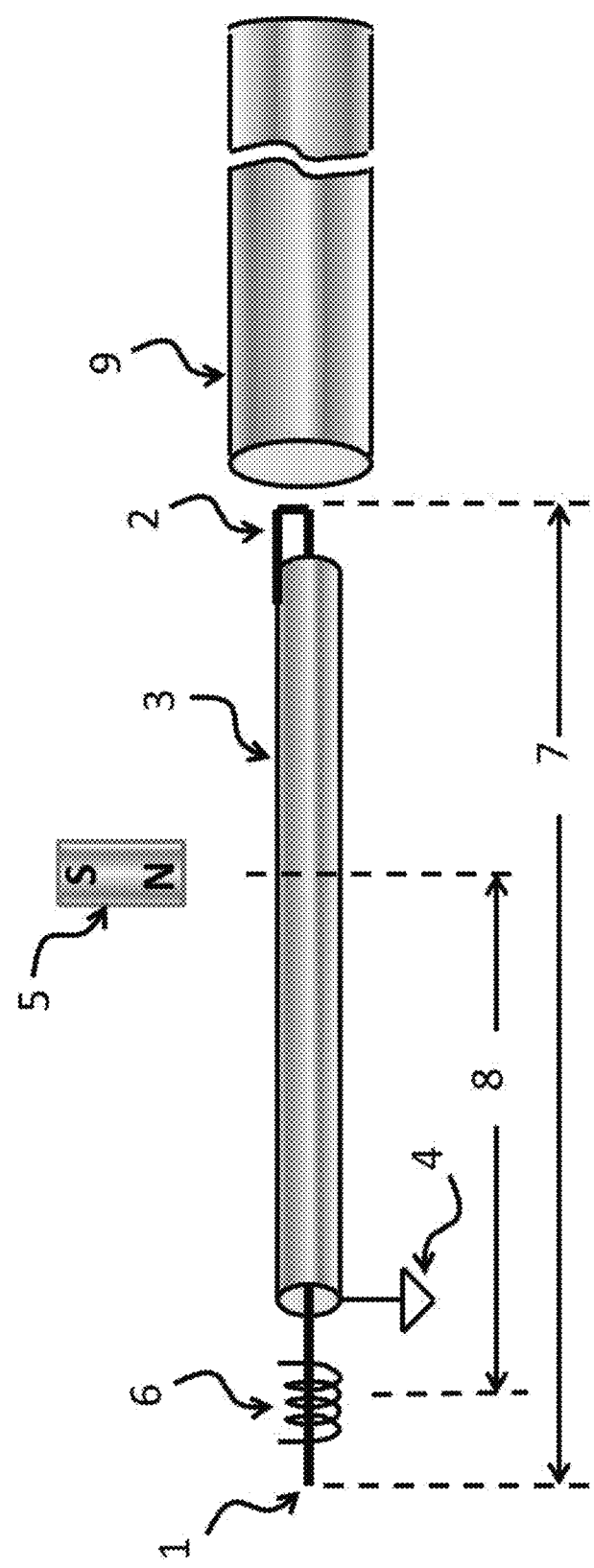
FIG. 1 is a waveguide circuit pictorial diagram, illustrating a portion of an embodiment of the invention in which waveguide 1 is coupled with return conductor (3) at junction (2), and return conductor (3) is connected to circuit common (4).

As shown in FIG. 1, the position sensor utilizes a magnetostrictive waveguide (1), a position magnet (5), and a pickup device (6). Waveguide (1) is formed of a magnetically permeable material, and is at least partially enclosed within a return conductor (3) that is electrically conductive, such as one made of copper or brass. If waveguide (1) is only partially enclosed within return conductor (3), it is desirable that a percentage of perimeter surface area surrounding waveguide (1) that is enclosed by return conductor (3) be equivalent to at least 80%. The greater the percentage area around waveguide (1) that is enclosed within return conductor (3), the more effective will be its shielding effectiveness against EMI. Coupling (2) provides electrical connection between waveguide (1) and return conductor (3), forming a waveguide circuit. Return conductor (3) is electrically connected with circuit common (4). The position magnet may be a single magnet, or may comprise more than one magnet, or may be a ring magnet or portion of a ring magnet. The position magnet typically is polarized in a direction so that the north or south pole is facing toward the waveguide. When an interrogation pulse is applied to waveguide (1), the circuit for current flow is completed by the current flowing back within return conductor (3) to circuit common (4). If the return conductor is highly conductive, only a negligible voltage is developed across its length, thus limiting its ability to radiate electromagnetic interference (EMI). The waveguide has a length (7). The location of a position magnet (5) is determined as a distance (8) between position magnet (5) and pickup (6). A strain wave traveling in waveguide (1) is converted by pickup (6) into an electrical signal pulse. Pickup (6) may be a coil of wire, or another type of pickup that can produce a signal pulse in response to a strain wave in a waveguide that passes through or proximate the pickup. Position magnet (5) is movable along at least a portion of waveguide length (7) between pickup device (6) and coupling (2). Enclosing waveguide (1) within return conductor (3) provides electromagnetic shielding when return conductor (3) is highly electrically conductive so that little voltage is developed across its length, and the least EMI may be produced when return conductor (3) is connected with circuit common (4). Also shown in FIG. 1 is housing (9) that may be non-electrically-conductive, or may be electrically conductive but insulated from return conductor (3). Housing (9) may be tubular, or another shape, and serves to provide physical protection and/or sealing of some of all of the other elements shown in FIG. 1. Although shown to one side for clarity in FIG. 1, waveguide (1) and return conductor (3) are at least partially contained within housing (9) when the sensor is fully assembled.

Figure 2:
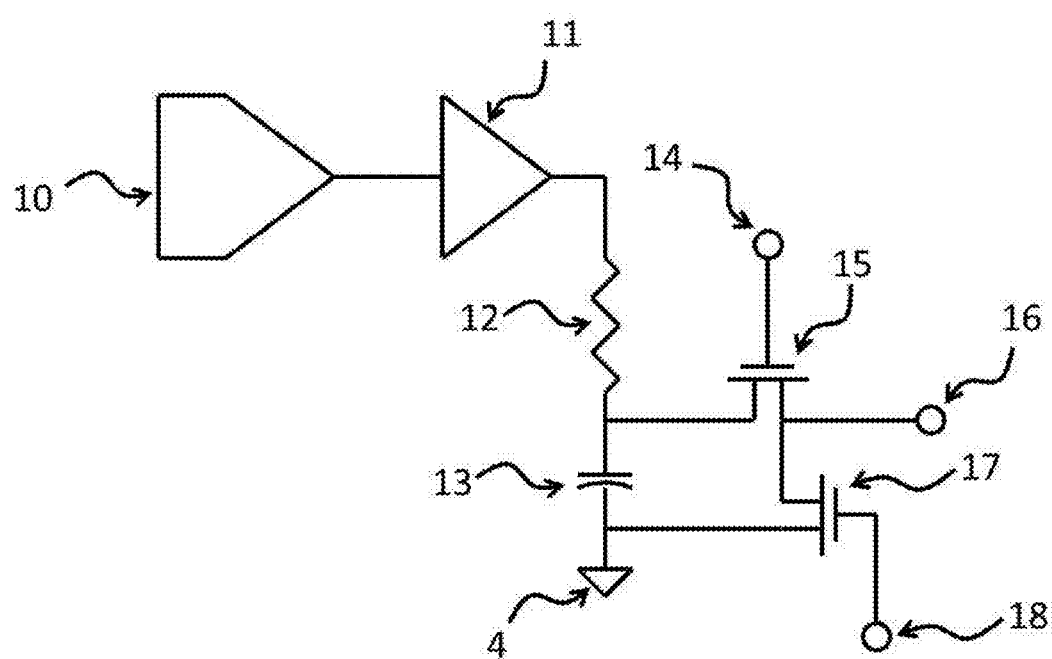
FIG. 2 is a waveguide driver and waveguide clamp pictorial diagram, illustrating a portion of an embodiment of the invention in which terminal (16) can be connected to the waveguide (1) to drive the waveguide, and terminal (16) can be essentially shorted to circuit common (4) by transistor (17).

As shown in FIG. 2, digital to analog converter (10) provides a voltage to buffer (11) that determines the output of buffer (11). The output of buffer (11) charges capacitance (13) either directly or through resistance (12). A voltage developed across capacitance (13) is called the interrogation voltage. The digital to analog converter provides an output voltage that is adjustable according to the waveguide length. If it is desired to pulse the waveguide at 2 amperes, for example, and impedance of the waveguide circuit happens to be 5 ohms for a given waveguide length, then it may require the capacitor to be charged to 10 volts. If another waveguide is longer than that, with perhaps, a waveguide circuit impedance of 6 ohms, then the DAC voltage may be set higher to provide an interrogation voltage of 12 volts, to again produce a desired 2 amperes of interrogation pulse current. So, the capacitor is charged to a voltage depending on the length of the waveguide.

According to the invention, Transistor (15) receives an interrogation pulse command at (14), turning on transistor (15) to discharge capacitance (13) into waveguide (1) via waveguide terminal (16). At some time after transistor (15) has been turned on, and preferably when transistor (15) is being turned off or thereafter, the waveguide is clamped by transistor (17) when it is enabled at terminal (18) so that a waveguide voltage at terminal (16) is connected to circuit common (4) either directly or through an impedance. The waveguide clamp can be a transistor as shown, or can be another device capable of providing a relatively low resistance connection, such as less than 100 ohms, between the waveguide and return conductor. Thus, the waveguide is first energized by passing a current for a short time through the waveguide from charged capacitance (13), and then current continues to pass in the waveguide, due to the energy stored in the waveguide, while the waveguide is clamped. This produces a larger amplitude strain wave for a given amount of energy being used to pulse the waveguide. The optimum delay time for a given waveguide and position magnet system can be ascertained by observing the amplitude of the signal pulse while adjusting the delay time, the greatest signal pulse amplitude being achieved by enabling the waveguide clamp coincident with or delayed shortly after (e.g. 0 to 5 microseconds) the falling edge of the interrogation pulse.

When the waveguide is not being interrogated, it is possible for the waveguide to conduct currents due to nearby fluctuating electric or magnetic fields. Such currents can cause an interfering signal to be developed in pickup (6). But clamping the waveguide to circuit common according to the present invention during times when the waveguide is not being interrogated prevents this from occurring, thus reducing the noise level.

Figure 3:
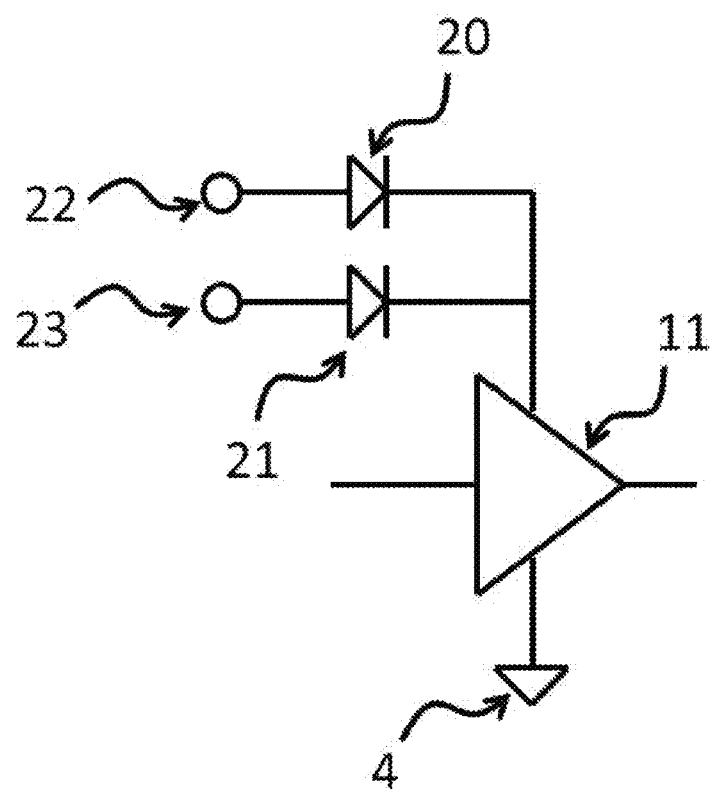
FIG. 3 is a voltage selector pictorial diagram, illustrating a portion of an embodiment of the invention in which terminal (22) accepts a generated voltage from a voltage increasing circuit, and terminal (23) accepts a voltage from a power supply, the approximately greater of the two forming the supply voltage of amplifier (11) or supplying a waveguide driver circuit or interrogation voltage.

Although DAC (1) provides a desired voltage level to buffer (11), the voltage available to charge capacitor (13) from buffer (11) in FIG. 3 comes from positive and negative buffer supply voltages to buffer (11). In FIG. 3, the positive supply voltage to buffer (11) is from either of two diodes (20, 21). The negative supply voltage to buffer (11) is circuit common (4). A power supply voltage is coupled with the selector at input (23) and a generated voltage is coupled with selector terminal (22). The greater of those two voltages is coupled with buffer (11) through first diode (20) or second diode (21).

Sometimes a power supply voltage to the sensor may be too low to provide a strong interrogation pulse, for example, less than 10 volts direct current (DC). In that case, a voltage increasing circuit can be used, such as that shown in FIG. 4. At other times, a power supply voltage to the sensor may be sufficiently high, for example, 24 volts DC. According to the invention, a positive supply voltage to buffer (11) is selected by the greater between a generated voltage at (22) and a power supply voltage at (23). Steering diodes (20, 21) enable the greater voltage to power buffer (11).

Figure 4:
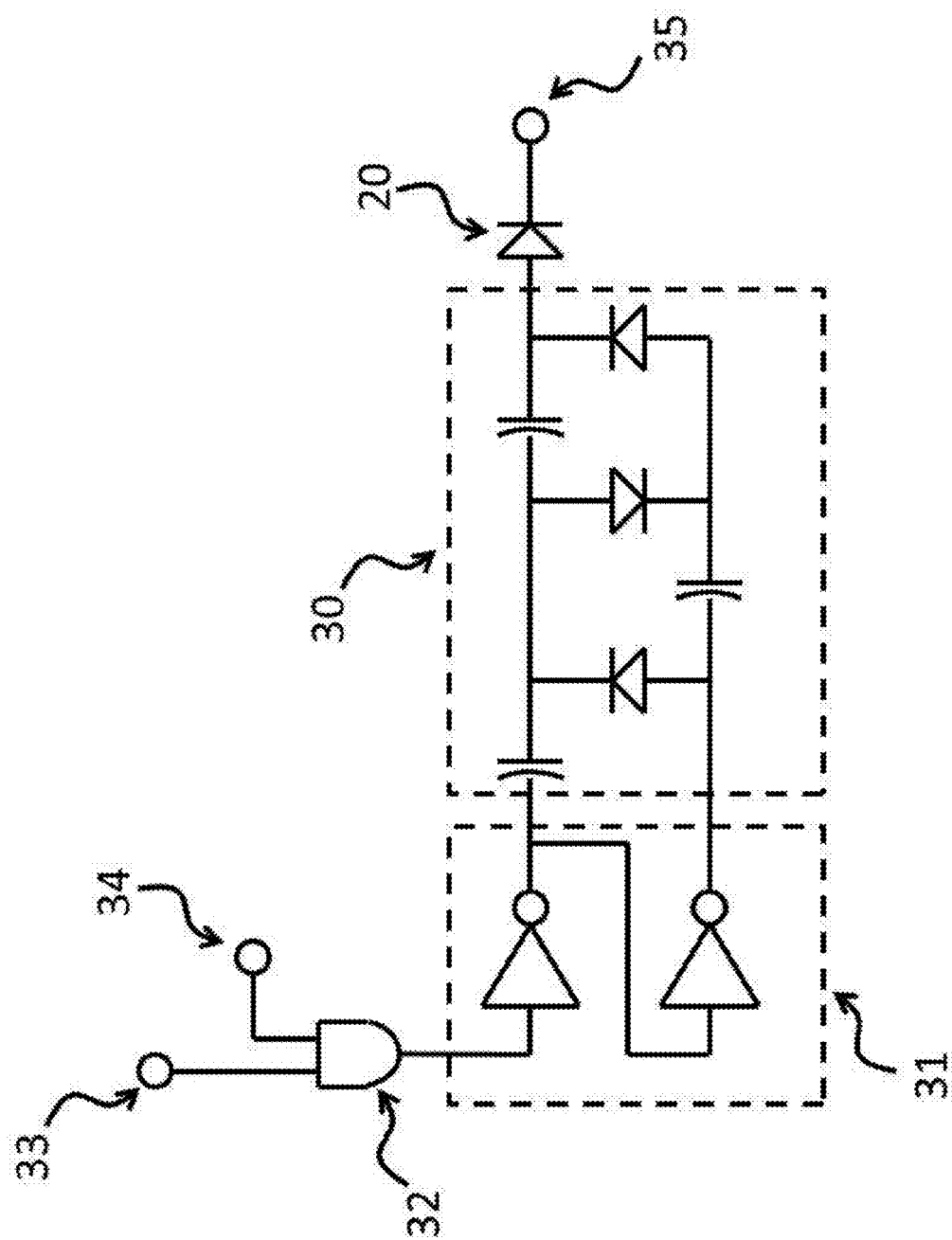
FIG. 4 is a switched voltage increasing circuit pictorial diagram, illustrating a portion of an embodiment of the invention in which diode and capacitor bank (30) is driven by driver (31) to produce a generated voltage at diode (20), while driver (31) is operated from AND gate (32). Terminal (33) is driven by an oscillating voltage, while switching input (34) can be used to switch driver (31) on or off.
Figure 5:
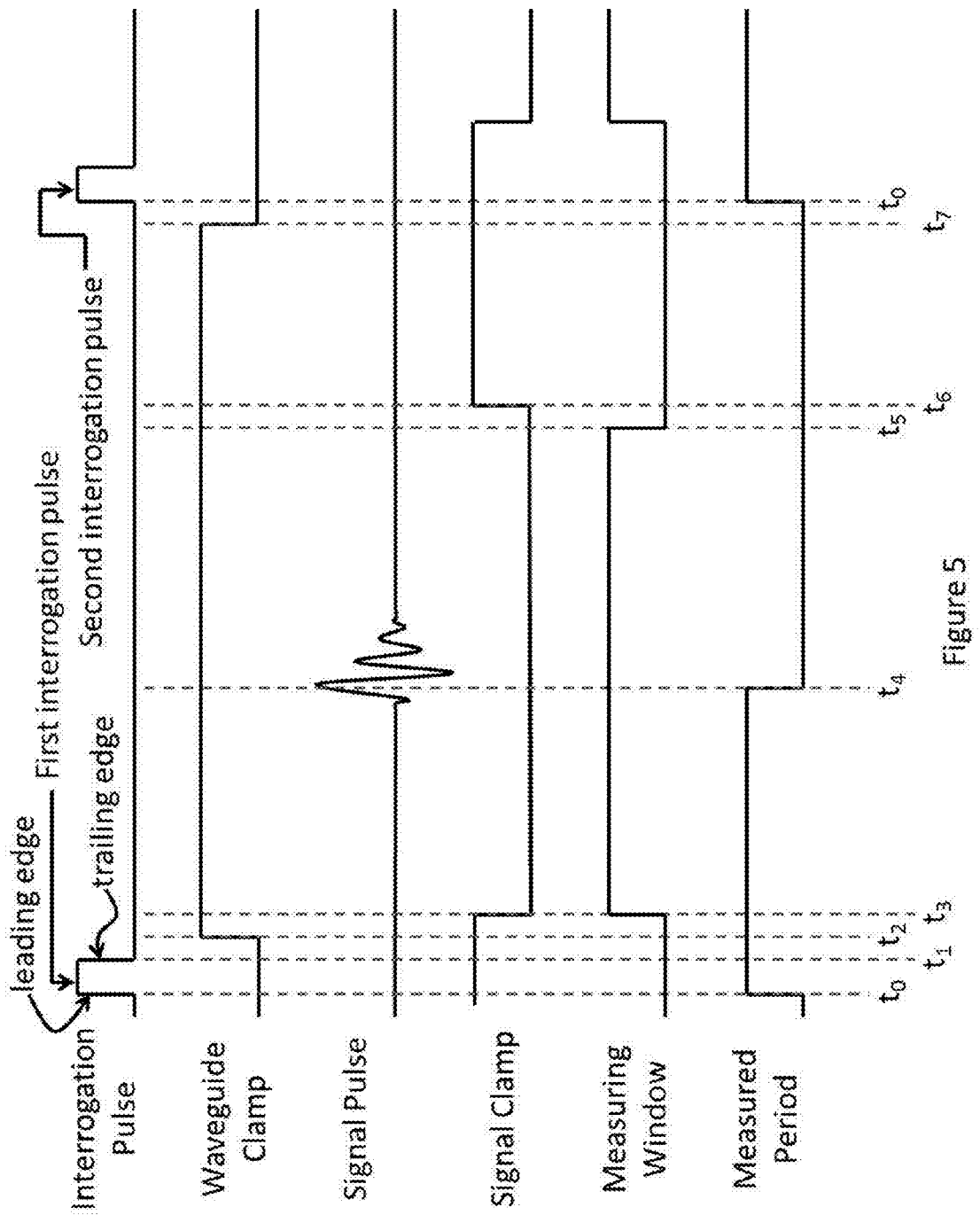
FIG. 5 is a timing diagram, illustrating portions of an embodiment of the invention in which a waveguide clamp changes state at time $t_2$ after start of an interrogation pulse at $t_0$ but before signal pulse $t_4$. A signal clamp has a state at or before the start of the waveguide pulse $t_0$, and remains in that state until the end or sometime after the end of the interrogation pulse at $t_1$.

As shown in FIG. 4, a driver (31) and capacitor-diode network (30) form a voltage increasing circuit to supply a generated voltage to diode (20) when an oscillating input (33) of AND gate (32) is oscillating at a frequency, for example, 1 megahertz (MHz), and a switching input (34) of the AND gate is held high. The generated voltage is greater than the logic voltages available directly from driver (31). Semiconductor logic circuits, such as depicted in FIG. 4 as driver (31), typically have output voltages (i.e. logic voltages) relative to the voltages applied to their power pins, for example, zero and +5 or +3.3 volts DC. While the voltage increasing circuit is operating, heavy charging currents may flow when the capacitors have previously been discharged. These charging currents can produce interfering voltages to form across sensitive parts of the sensor circuitry. To avoid this, switching input (34) is held at a logic low to disable the driver during at least a portion of a time of a measuring window (a measuring window is shown in FIG. 5). According to the present invention, the amount of time during which the driver is disabled is based on the length of the waveguide or to the amount of time between interrogation pulses.

FIG. 5 shows some of the various timing of signals and pulses according to the invention. $t_0$ marks the rising edge of an interrogation pulse. First and second interrogation pulses are shown of a continuing series of interrogation pulses. Waveguide clamp may be asserted (logic high) at the time $t_1$, which is the falling edge of the interrogation pulse, or delayed until ($t_2$) as shown, by an amount of time as needed to provide the highest amplitude signal pulse. The waveguide clamp is released again ($t_7$) at some time before the next interrogation pulse, or coincident with the next interrogation pulse.

Signal clamp is enabled (logic high) at a time before or coincident with an interrogation pulse. A measured period as shown in FIG. 5 starts with an interrogation pulse, or after a delay to avoid any interference with the signal pulse by the interrogation pulse, and concludes on detection of a signal pulse ($t_4$). A signal pulse may occur following an interrogation pulse, after a time period has elapsed that is approximately dependent on the length of the waveguide that is between the position magnet (5) and the pickup (6), and is represented in FIG. 5 as the time between $t_0$ and $t_4$. The interrogation pulse may produce an interference with the pickup. To avoid this, it may not desired to detect a signal pulse until some time passes after an interrogation pulse. In FIG. 5, the start of a measuring window is shown at time $t_3$. The time between $t_3$ and $t_5$ may be called the measuring window. The time between two consecutive interrogation pulses, i.e. from a given $t_0$ to the next $t_0$, is an interrogation period.

Figure 6:
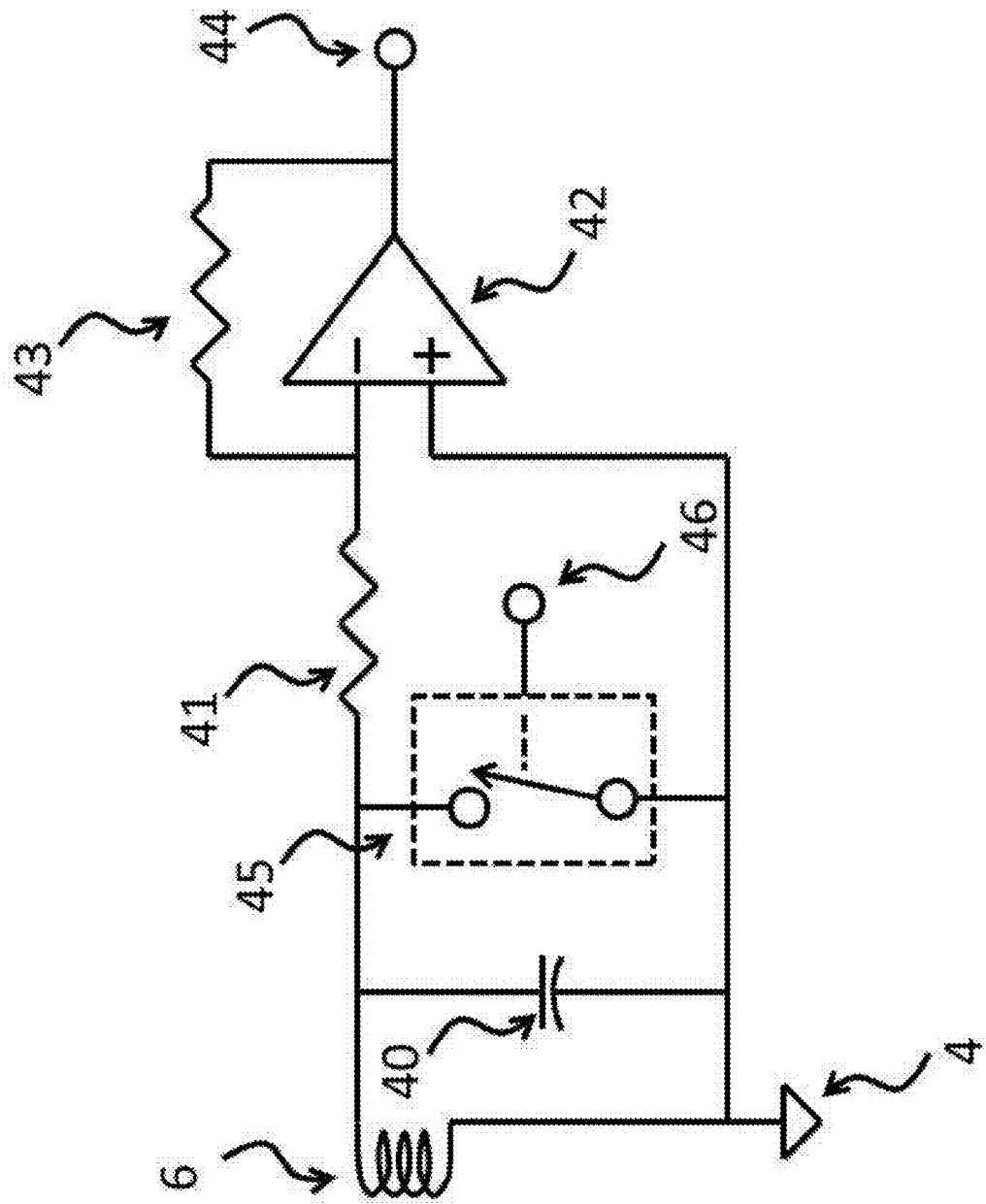
FIG. 6 is a signal clamp pictorial diagram, illustrating a portion of an embodiment of the invention in which pickup (6) provides a signal pulse to amplifier (42) through resistor (41), and the signal pulse is clamped to circuit common (4) by signal clamp device (45) according to a logic level present at signal clamp input (46). Signal clamp device (45) is a transistor, semiconductor switch, or other switching device.

Pickup (6) in FIG. 6 is typically tuned by a capacitance (40) and through resistance (41), is coupled with amplifier (42). Amplifier (42) provides gain or acts as a buffer to produce signal pulse output (44). Since amplifier (42) is connected to provide a virtual ground at its inverting input, resistance (41) acts as a virtual load across pickup (6). Signal clamp device (45) provides clamping of the signal of pickup (6) whenever a logic high is asserted at signal clamp input (46). The connections made to circuit common (4) in FIG. 6 may instead be connected to another point that is convenient to the overall circuit design. Connecting together the two terminals of pickup (6) by signal clamp device (45) also enables faster decay of any energy induced into pickup (6) due to the interrogation pulse. Signal clamp device (45) may be a transistor as shown, or another device capable of connecting across terminals of pickup (6) with a resistance of less than 100 ohms. A signal clamp period is the time during which the signal clamp is enabled and there is a relatively low resistance connection across pickup (6).

Figure 7:
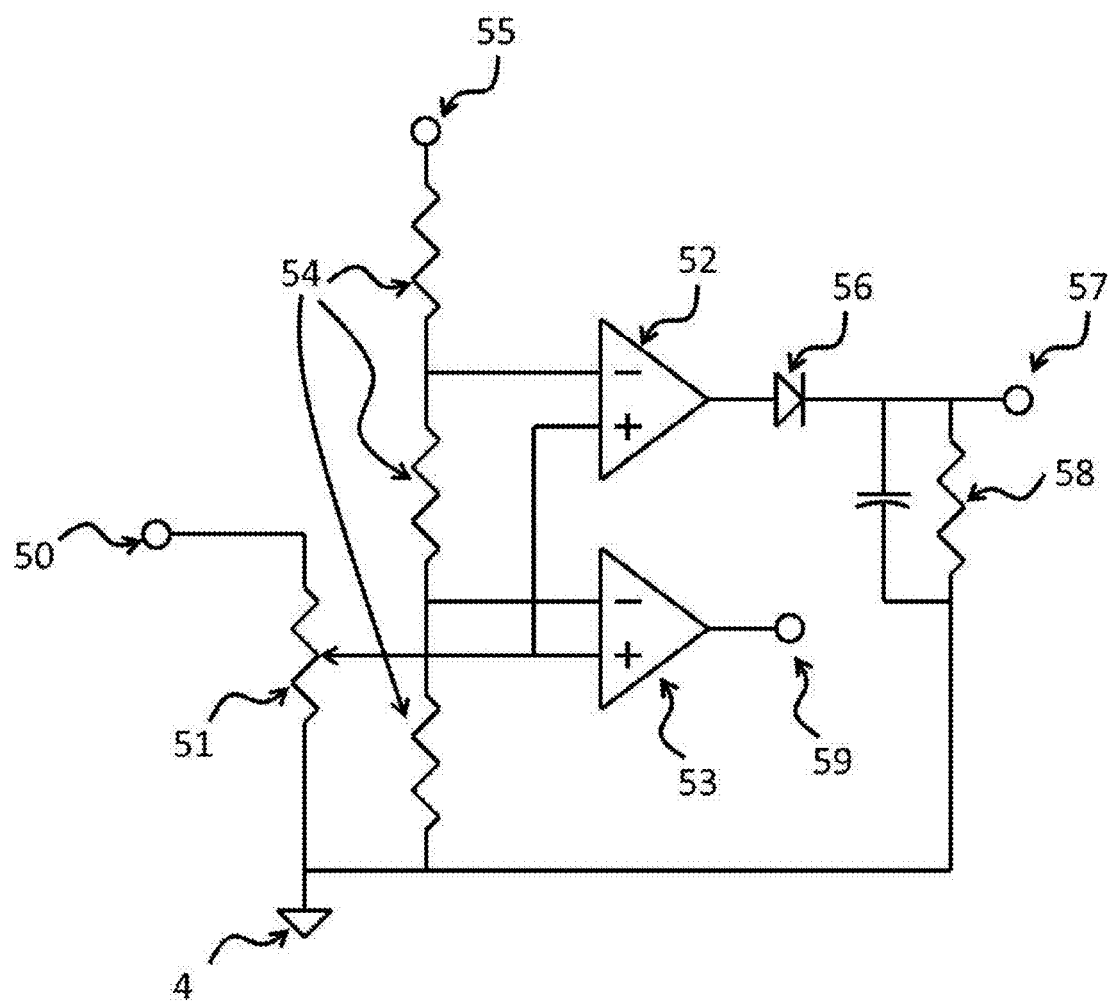
FIG. 7 is a voltage adjusting circuit and pulse detector pictorial diagram, illustrating a portion of an embodiment of the invention in which an amplitude of a signal pulse at terminal 50 is adjusted by potentiometer 51, based on a signal pulse voltage 57, and the signal pulse is detected by comparator (53) producing a detector output (59) that is indicative of a measured period.

FIG. 7 shows a voltage adjusting circuit and pulse detector according to the invention. A signal pulse, such as one at terminal (44) of FIG. 6, is applied to input terminal (50). Potentiometer (51) divides a portion of the signal pulse for non-inverting inputs of comparators (52, 53). Although a potentiometer is shown in FIG. 7, another voltage adjusting device or circuit may be used, such as a gain-controlled amplifier or another type of attenuator. A voltage at (55) is divided to provide a setpoint to the inverting input of a first comparator (52). The reference is further divided to provide a somewhat lower setpoint to the inverting input of a second comparator (53). Whenever a peak voltage of a signal pulse exceeds the setpoint of the first comparator (52), diode 56 allows resistor/capacitor network (58) to charge to a higher voltage. A transistor or switch device may be used in place of diode (56). When there is no signal pulse having a peak voltage high enough to exceed the setpoint of the first comparator (52), then the voltage across resistance/capacitance network (58) steadily discharges and, in FIG. 7, will reach zero volts after a time passes without any signal pulses having exceeded the setpoint of the first comparator. According to the present invention, the resulting signal tracking voltage (57) is monitored and the setting of potentiometer (51) is adjusted to obtain a signal tracking voltage (57) that is greater than zero. Therefore, when the signal tracking voltage (57) is greater than zero, that means there are signal pulses present, at least occasionally, that exceed the setpoint of the first comparator (52). And when the setpoint of the second comparator (53) is set sufficiently lower than that, such as when the second comparator is set to 60% of the setpoint of the first comparator, the signal pulse may always exceed a setpoint of the second comparator (53). This ensures that the signal level is high enough for a reliable signal, but not so high as to reduce the S/N ratio. Second comparator (53) therefore may act as a reliable detector of the presence of a signal pulse.

Figure 8:
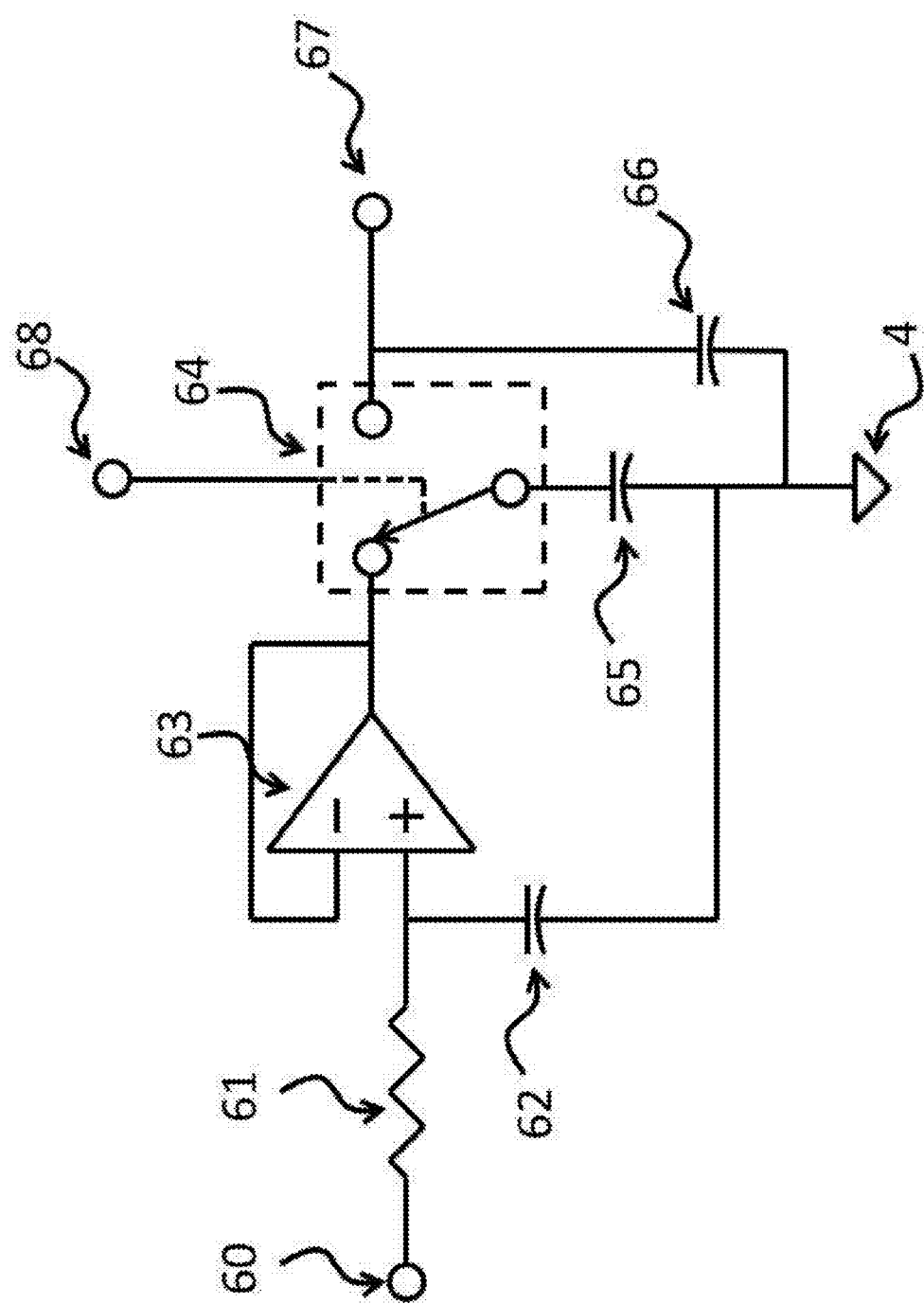
FIG. 8 is an adjustable switched capacitor filter circuit pictorial diagram, illustrating a portion of an embodiment of the invention in which a switched capacitor filter has a switching frequency that is controlled by a microcontroller through filter control (68) at a frequency that is based on the repetition rate of the interrogation pulse and the length of the waveguide.

FIG. 8 shows a switched capacitor filter according to the invention. A voltage waveform representative of a position measurement, such as the measured period shown in FIG. 5, is connected with filter input (60) to a resistance capacitance low pass filter (61, 62), acting as an anti-alias filter, then to amplifier or buffer (63). The DC voltage output of amplifier or buffer (63) is representative of the position being measured, but further filtering may be desired to reduce its ripple voltage, or alternating current (AC) content. Filter switch (64) works with capacitances (65, 66) to form a switched capacitor low pass filter, and having a filter frequency above which AC ripple is greatly reduced. The value of capacitor (66) is larger than that of capacitor (65), such as being one hundred times as large. Single pole double throw switch (64) moves back and forth at a switching frequency, such as 100 times the filter frequency. The switching frequency is applied at terminal (68). According to the invention, the switching frequency is adjusted according to the length of the waveguide and the repetition rate of the interrogation pulse, such that using a longer waveguide length and/or lower interrogation frequency results in application of a lower filter switching frequency.

Figure 9:
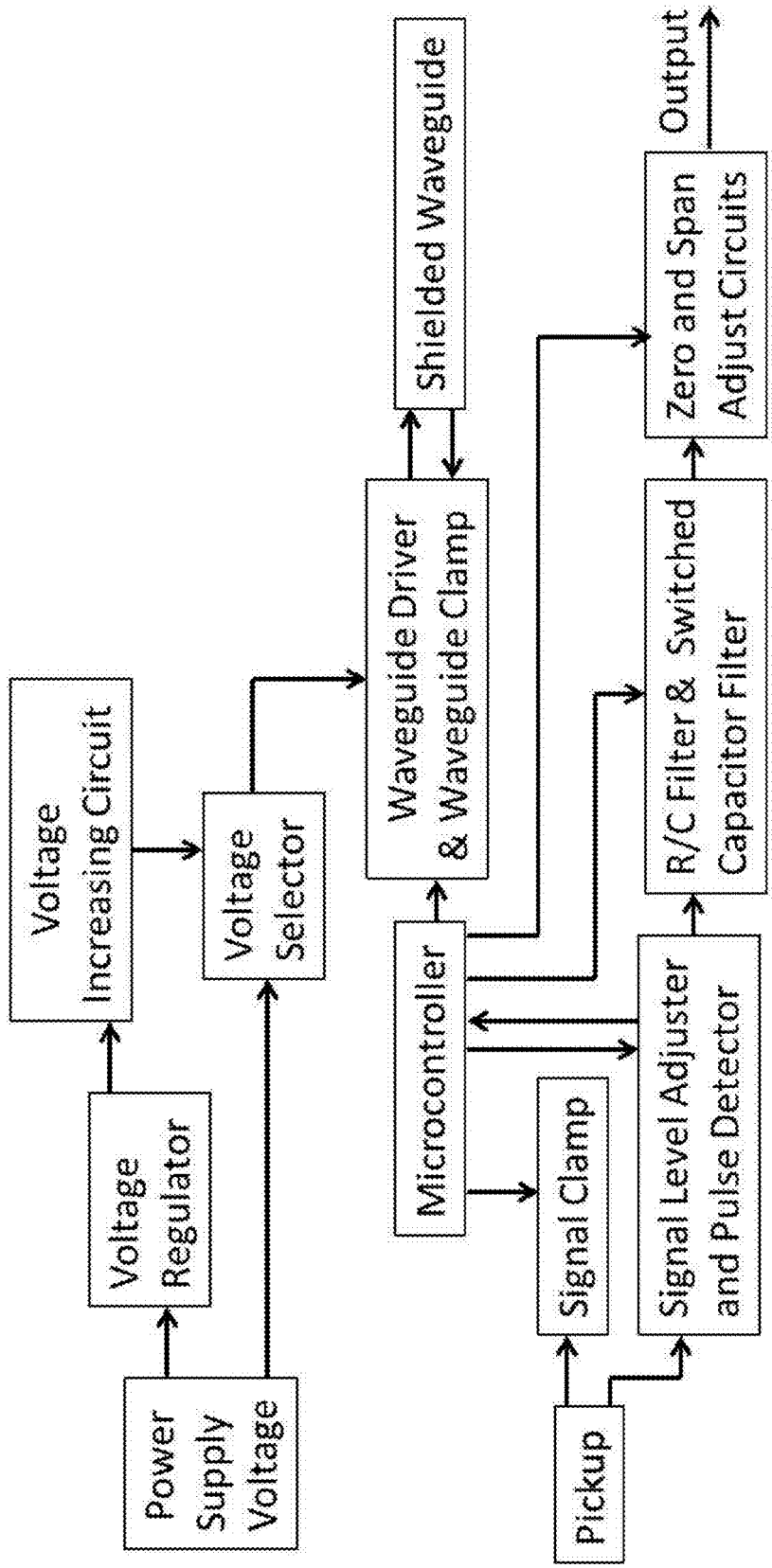
FIG. 9 is a block diagram illustrating a portion of an embodiment of the invention in which representations of the preceding figures are included, and which also shows a signal path that runs outside of the microcontroller, and in which zero and span controls are controlled by a microcontroller.

FIG. 9 is a block diagram showing the several parts of the invention working together. The microcontroller controls a timing sequence, but the path of the measured signal does not pass through the microcontroller. The signal passes through zero and span adjusting circuits that are also controlled by the microcontroller.

I claim:

1. A sensor having a waveguide and measuring a position, the waveguide having a length, the waveguide having a lateral surface area, a waveguide circuit comprising at least the waveguide, a coupling, and a return conductor, the waveguide and return conductor having ends, electrically connected together by the coupling, the return conductor surrounding of the lateral surface area of the waveguide over a portion of the waveguide length, the return conductor connected with a circuit common, ground, or shield, the waveguide and return conductor enclosed within a housing, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

2. A sensor having a waveguide circuit, the waveguide circuit comprising a waveguide and a return conductor, first and second interrogation pulses applied to the waveguide circuit, a waveguide clamp capable of being enabled or disabled, the enabling of the waveguide clamp causing the waveguide and the return conductor to be connected together through an impedance of no greater than 50 ohms, the waveguide clamp being enabled after a leading edge of the first interrogation pulse, and the waveguide clamp disabled at a time before or coincident with a leading edge of the second interrogation pulse, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

3. A sensor as in claim 2, each interrogation pulse having a trailing edge, the waveguide clamp enabled coincident with or after the trailing edge of the first interrogation pulse.

4. A sensor having a waveguide, the waveguide having a length, an interrogation pulse applied to the waveguide, an interrogation voltage having an amplitude, the interrogation voltage appearing across a capacitance, the interrogation voltage amplitude being adjustable, the interrogation voltage amplitude adjusted in relation to the length of the waveguide, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

5. A sensor as in claim 4, a buffer providing the interrogation voltage, a voltage selector providing a buffer supply voltage by selecting the greater between a power supply voltage and a generated voltage.

6. A sensor as in claim 5, the generated voltage being produced by a voltage increasing circuit, the voltage increasing circuit having a logic voltage, the generated voltage being greater than the logic voltage, the voltage increasing circuit having a capability of being enabled or disabled, the interrogation pulse being repetitive, consecutive interrogation pulses, a time between two consecutive interrogation pulses forming an interrogation period, the interrogation period being approximately proportional to the waveguide length, the voltage increasing circuit being enabled and disabled during an interrogation period.

7. A sensor having a waveguide, an interrogation pulse applied to the waveguide, the interrogation pulse having a pulse width, a pickup proximate the waveguide and having electrical connections, a signal clamp device having a signal clamp input and connected across at least two of the pickup electrical connections during a signal clamp period, the signal clamp device being open or closed, the signal clamp device having a resistance of less than 100 ohms when closed, the signal clamp period coincident with at least a part of the interrogation pulse width, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

8. A sensor as in claim 7, the sensor measuring a position and having a measuring window, the signal clamp input coupled with a microcontroller, microprocessor, or other controlling device that is coupled with the signal clamp input and causing the signal clamp device to close during a signal clamp period related to the interrogation pulse, and causing the signal clamp device to open during a time period related to the measuring window.

9. A sensor as in claim 7, first and second interrogation pulses applied consecutively to the waveguide, a time period between the first and second interrogation pulses defining an interrogation period, the signal clamp device having both an open state and a closed state during the interrogation period.

10. A sensor having a waveguide and measuring a position, a strain wave traveling in the waveguide, a pickup proximate the waveguide and producing a signal pulse in response to the strain wave, a voltage adjusting circuit providing an adjusted signal pulse having an amplitude;

a voltage divider providing first and second set points coupled respectively with first and second comparators, the adjusted signal pulse being coupled with first and second comparators, the first and second comparators each having an output, the output of the first comparator coupled with a capacitance, a signal tracking voltage being developed across the capacitance, the signal tracking voltage increasing when the adjusted signal pulse amplitude exceeds the first set point, the voltage adjusting circuit being adjusted relative to the signal tracking voltage, the output of the second comparator transitioning between two voltages in response to a variation in the amplitude of the adjusted signal pulse above or below the second set point, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

11. A sensor having a waveguide and measuring a position, the waveguide having a length, interrogation pulses applied to the waveguide at an interrogation frequency, the interrogation frequency being related to the waveguide length;

a switched capacitor filter having a switching frequency, the switching frequency related to the interrogation frequency or to the waveguide length, wherein the sensor having at least one signal voltage or signal current that is representative of the measured position, the signal voltage or signal current coupled with at least one zero control or one span control, the zero or span controls being adjusted by a microcontroller, microprocessor, digital signal processor, to provide a desired output signal.

12. The sensor of claim 1, the zero or span control being a digitally adjustable variable resistance or potentiometer.

13. A sensor as in claim 1, an interrogation pulse applied to the waveguide, the interrogation pulse having a pulse width, a pickup proximate the waveguide and having electrical connections, a signal clamp device having a signal clamp input and connected across at least two of the pickup electrical connections during a signal clamp period, the signal clamp device being open or closed, the signal clamp device having a resistance of less than 100 ohms when closed, the signal clamp period coincident with at least a part of the interrogation pulse width.

14. A sensor according to claim 1, a strain wave traveling in the waveguide, a pickup proximate the waveguide and producing a signal pulse in response to the strain wave, a voltage adjusting circuit providing an adjusted signal pulse having an amplitude; a voltage divider providing first and second set points coupled respectively with first and second comparators, the adjusted signal pulse being coupled with first and second comparators, the first and second comparators each having an output, the output of the first comparator coupled with a capacitance, a signal tracking voltage being developed across the capacitance, the signal tracking voltage increasing when the adjusted signal pulse amplitude exceeds the first set point, the voltage adjusting circuit being adjusted relative to the signal tracking voltage, the output of the second comparator transitioning between two voltages in response to a variation in the amplitude of the adjusted signal pulse above or below the second set point.

15. A sensor as in claim 1, first and second interrogation pulses applied to the waveguide circuit, each interrogation pulse having a leading edge, a waveguide clamp capable of being enabled or disabled, the enabling of the waveguide clamp causing the waveguide and the return conductor to be connected together through an impedance of no greater than 50 ohms, the waveguide clamp being enabled after the leading edge of the first interrogation pulse, and the waveguide clamp disabled at a time before or coincident with the leading edge of the second interrogation pulse.

16. A sensor as in claim 2, an interrogation pulse having a pulse width, a pickup proximate the waveguide and having electrical connections, a signal clamp device having a signal clamp input and connected across at least two of the pickup electrical connections during a signal clamp period, the signal clamp device being open or closed, the signal clamp device having a resistance of less than 100 ohms when closed, the signal clamp period coincident with at least a part of the interrogation pulse width.

17. A sensor as in claim 4, the interrogation pulse having a pulse width, a pickup proximate the waveguide and having electrical connections, a signal clamp device having a signal clamp input and connected across at least two of the pickup electrical connections during a signal clamp period, the signal clamp device being open or closed, the signal clamp device having a resistance of less than 100 ohms when closed, the signal clamp period coincident with at least a part of the interrogation pulse width.

18. A sensor as in claim 10, the waveguide having a length, interrogation pulses applied to the waveguide at an interrogation frequency, the interrogation frequency being related to the waveguide length;

a switched capacitor filter having a switching frequency, the switching frequency related to the interrogation frequency or to the waveguide length.

\* \* \* \* \*